United States Patent Office 2,777,154
Patented Jan. 15, 1957

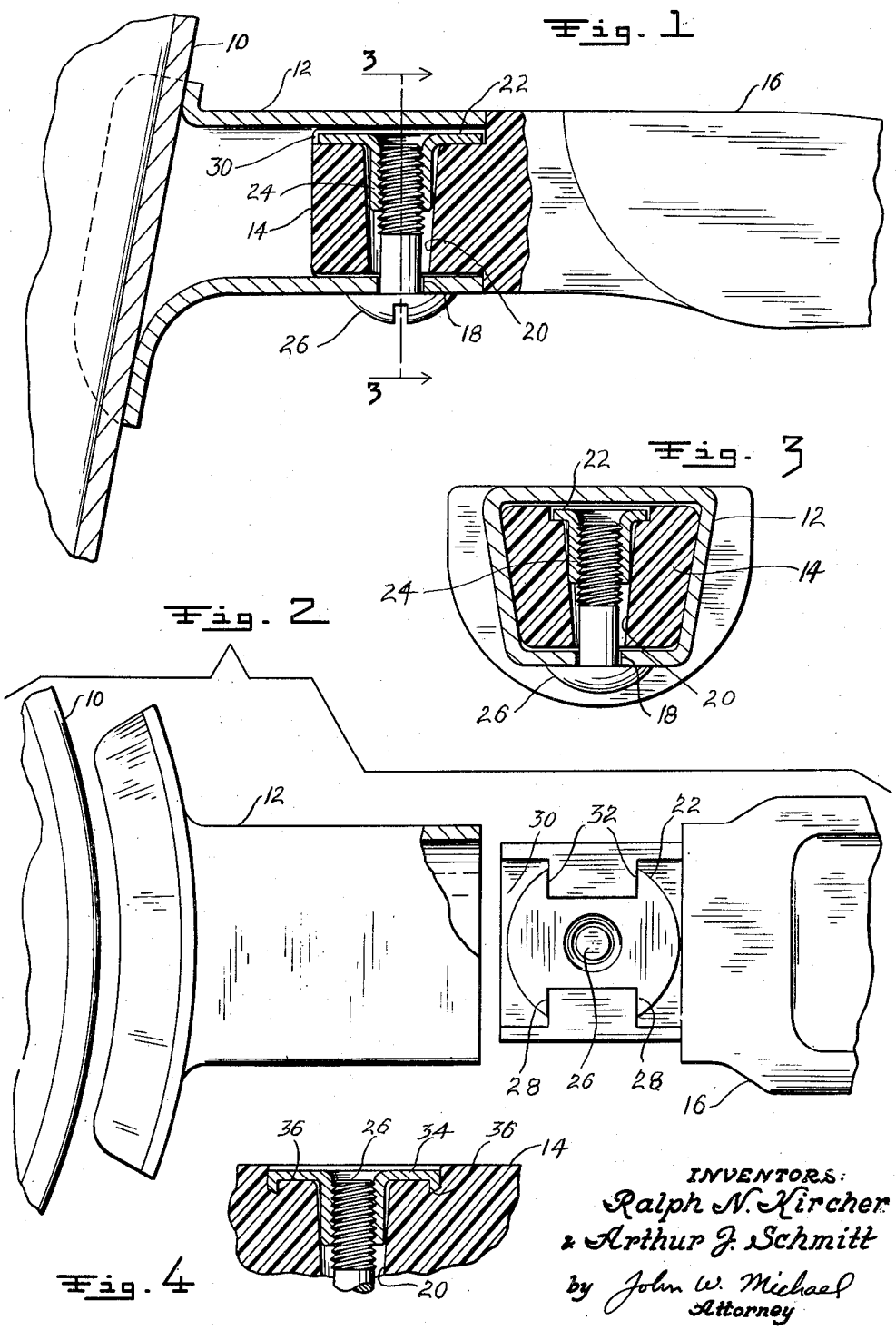

2,777,154

HANDLE ASSEMBLY FOR SAUCEPANS

Ralph N. Kircher and Arthur J. Schmitt, West Bend, Wis., assignors to West Bend Aluminum Co., West Bend, Wis., a corporation of Wisconsin Application June 7, 1955, Serial No. 513,744

2 Claims. (Cl. 16—110)

This invention relates to handle assemblies for saucepans.

One problem with molded non-metallic handles for saucepans is the occurrence of a concealed crack or partial break within the handle socket at the place where the handle is weakened by the hole for the anchoring bolt. Such crack or partial break usually becomes complete and the handle separated from the saucepan when the saucepan is filled with dangerously hot material. This may lead to severe burns or damage to the user.

It is the object of this invention, therefore, to provide a handle assembly which will prevent a complete separation of the handle from the saucepan even though a break occurs in the handle within the handle socket.

This object is obtained by using a nut on the handle anchoring bolt with shoulders facing each other from positions spaced longitudinally of the handle on opposite sides of such bolt. These shoulders engage portions on the handle tenon also spaced longitudinally of the handle on opposite sides of the anchor bolt hole in such tenon. If a break occurs at such hole the nut will thus prevent entire separation of the tenon and the handle will remain connected with the saucepan thus preventing spilling of the saucepan contents.

The details of embodiment of this invention can be understood from the following specification and drawings, in which:

Fig. 1 is a view partly in side elevation and partly in section of a handle assembly embodying the present invention;

Fig. 2 is a fragmentary exploded view in top plan elevation showing the elements of the handle assembly of Fig. 1;

Fig. 3 is a sectional view taken on the line 3—3 of Fig. 1; and

Fig. 4 is a fragmentary sectional view showing a modification of one of the elements of a handle assembly embodying this invention.

The handle assembly is attached in the usual way to the side wall of a utensil 10 (saucepan or the like). Such utensil has welded to it a socket 12 having an elongated tubular portion into which a tenon 14 on a non-metallic handle 16 is fitted. While not necessary, it is desirable to have a slight taper to the side walls of the socket 12 and tenon 14 to provide a wedging action, as hereinafter described.

The bottom of the socket 12 has a hole 18 which is in alignment with a tapered hole 20 in the tenon 14 to permit an anchoring bolt 26 to pass from the bottom of the socket into the tenon. A nut 22 provided with a depending internally threaded neck 24 is drawn downwardly against the top of the tenon 14 by the bolt 26. Such downward force placed on the tenon 14 wedges the tapered sides of the tenon against the tapered sides of the socket to provide a firm, tight engagement. The bottom of the tenon 14 is sufficiently spaced from the bottom of socket 12 to permit such binding action.

The top of the nut 22 is symmetrically shaped as shown to provide opposite facing shoulders 28. These shoulders are spaced longitudinally of the handle when the nut is placed in a recess 30 formed in the top of the tenon 14. This recess is shaped to provide abutments 32 which are engaged by such shoulders 28. If a crack or break develops through the section of the tenon passing through the hole 20, the shoulders 28 engage the abutments 32 to hold them together and thus prevent the broken end of the tenon from becoming separated from the handle 16. Thus the handle, even though a break so occurs, will remain sufficiently connected to the socket 12 to prevent the contents of the utensil 10 from spilling even though some misalignment becomes apparent.

In the modification shown in Fig. 4, the nut 34 has downwardly depending teeth 36 which bite into the surface of the tenon 14 and provide the oppositely reacting parts which function in the same manner as the shoulders 28 and abutments 32.

We claim:

1. In a handle assembly for saucepans or the like: a socket having an elongated tubular portion terminating in an outer open end for receiving the tenon of a handle, said portion having a flat imperforate top and a flat bottom, said bottom having a hole located between the longitudinal center of said portion and said outer end; a handle having a tenon fitting within said portion from said open end, the inner end of said tenon being substantially spaced from the inner end of said portion, a hole in said tenon aligned with said hole in said bottom for receiving a bolt; a bolt passing through said hole in said portion and entering into said hole in said tenon; and a nut engaged by said bolt and drawn against the top of said tenon beneath said flat top, said nut having tenon engaging faces substantially parallel to the longitudinal axis of said bolt and spaced from said hole in said tenon on opposite sides of a plane passing through the axis of said hole in said tenon and normal to the longitudinal axis of said tenon; portions on the top of said tenon being in abutting relation with said tenon engaging faces whereby said faces and portions hold said tenon from dismemberment and disengagement with said handle when a break occurs in a section of said tenon containing said hole in said tenon.

2. The handle assembly as claimed in claim 1 in which said tenon engaging faces are formed by downwardly depending teeth on said nut biting into the material of said tenon.

References Cited in the file of this patent

UNITED STATES PATENTS

| 945,737 | Anderson | Jan. 11, 1910 |
|---|---|---|
| 1,605,981 | Pfefferkorn | Nov. 9, 1926 |
| 1,775,765 | Hennessy | Sept. 16, 1930 |
| 2,102,558 | Johnson | Dec. 14, 1937 |
| 2,579,011 | Pieper | Dec. 18, 1951 |
| 2,691,552 | Bauman | Oct. 12, 1954 |